United States Patent
Wang et al.

(10) Patent No.: US 11,598,180 B2
(45) Date of Patent: Mar. 7, 2023

(54) EXPERIMENTAL DEVICE AND EXPERIMENTAL METHOD FOR NATURAL GAS HYDRATE SOLID-STATE FLUIDIZED MINING AND CRUSHING

(71) Applicant: SouthWest Petroleum University, Sichuan (CN)

(72) Inventors: Guorong Wang, Sichuan (CN); Shouwei Zhou, Sichuan (CN); Qingyou Liu, Sichuan (CN); Qingping Li, Sichuan (CN); Qiang Fu, Sichuan (CN); Yufa He, Sichuan (CN); Pu Yang, Sichuan (CN); Lin Zhong, Sichuan (CN)

(73) Assignee: SOUTHWEST PETROLEUM UNIVERSITY, Sichuan (CN)

( * ) Notice: Subject to any disclaimer, the term of this patent is extended or adjusted under 35 U.S.C. 154(b) by 372 days.

(21) Appl. No.: 16/963,715

(22) PCT Filed: May 21, 2018

(86) PCT No.: PCT/CN2018/087651
§ 371 (c)(1),
(2) Date: Jul. 21, 2020

(87) PCT Pub. No.: WO2019/218374
PCT Pub. Date: Nov. 21, 2019

(65) Prior Publication Data
US 2021/0079762 A1  Mar. 18, 2021

(30) Foreign Application Priority Data

May 15, 2018 (CN) .......................... 201810464318.3

(51) Int. Cl.
*E21B 41/00* (2006.01)
*G01N 1/28* (2006.01)
(Continued)

(52) U.S. Cl.
CPC ........ *E21B 41/0099* (2020.05); *B01D 21/267* (2013.01); *B02C 19/068* (2013.01);
(Continued)

(58) Field of Classification Search
CPC ...... E21B 41/0099; E21B 43/01; E21B 49/00; B01D 21/267; B02C 19/068; B02C 23/10; B04C 9/00; G01N 1/286; G01N 2001/002
See application file for complete search history.

(56) References Cited

U.S. PATENT DOCUMENTS 5,660,335 A * 8/1997 Koppl ................. B02C 19/0056
                                                  241/1
2009/0072545 A1* 3/2009 Van Michaels ........... F03G 6/00
                                                  290/1 A
(Continued)

FOREIGN PATENT DOCUMENTS

CN  105004849 A  10/2015
CN  105064959 A  11/2015
(Continued)

OTHER PUBLICATIONS

English language machine translation of CN 105064959 A. (Year: 2015).*

*Primary Examiner* — Joseph W Drodge
(74) *Attorney, Agent, or Firm* — Muncy, Geissler, Olds & Lowe, P.C.

(57) ABSTRACT

The invention discloses an experimental device for natural gas hydrate solid-state fluidized mining and crushing, the experimental device comprising a power liquid supply module, a hydrate suction module, a pipeline conveying module, a hydrate fluidized crushing module, a secondary processing module and an experimental data information collection and processing module. An experimental method for the experimental device comprises: turning on the power liquid supply (Continued)

module, the hydrate suction module, the pipeline conveying module, the hydrate fluidized crushing module and the secondary processing module, and collecting pressure and flow data at a plurality of locations by the experimental data information collection and processing module. The present invention has the following beneficial effects: a jet solid-state fluidized mining process is simulated, and a plurality of pressure and flow detection points and sampling ports for crushed samples are provided at the same time so as to facilitate parameter collection; a plurality of component parameters are flexibly variable, including changing a drag-back speed of a moving slider, shape parameters of jet nozzles, and a pressure and flow of a power liquid; a spray head is designed to simplify the experimental device, and a dynamic process of jet crushing may be observed from a side surface of an experimental tank.

10 Claims, 2 Drawing Sheets

(51) Int. Cl.
*B02C 19/06* (2006.01)
*B04C 9/00* (2006.01)
*B01D 21/26* (2006.01)
*B02C 23/10* (2006.01)
*E21B 43/01* (2006.01)
*G01N 1/00* (2006.01)

(52) U.S. Cl.
CPC ............... *B02C 23/10* (2013.01); *B04C 9/00* (2013.01); *G01N 1/286* (2013.01); *E21B 43/01* (2013.01); *G01N 2001/002* (2013.01)

(56) References Cited

U.S. PATENT DOCUMENTS

2009/0235586 A1* 9/2009 Katoh ................... C10L 3/108
48/127.9
2012/0234552 A1 9/2012 Vaughan

FOREIGN PATENT DOCUMENTS

| CN | 105545257 A | 5/2016 |
| CN | 105587303 A | 5/2016 |

* cited by examiner

EXPERIMENTAL DEVICE AND EXPERIMENTAL METHOD FOR NATURAL GAS HYDRATE SOLID-STATE FLUIDIZED MINING AND CRUSHING

TECHNICAL FIELD

The present invention relates to an experimental device and an experimental method for natural gas hydrate solid-state fluidized mining and crushing, and more particularly to an experimental device and an experimental method for natural gas hydrate solid-state fluidized mining and crushing, which are suitable for deep sea non-diagenetic natural gas hydrate solid-state fluidization jet mining, crushing, recovery and separation methods.

BACKGROUND ART

Natural gas hydrates are alternative energy sources with a development potential, and have a total storage about twice that of other fossil energy sources. About 85% of natural gas hydrates in the South China Sea are deposited in shallow sediments of the deep seabed in a form of weak cementation (non-diagenesis). At present, there are mining methods for natural gas hydrates including an injection method, a depressurization method, a chemical injection method, and the combined application of the above methods. However, the above existing methods all need to break inherent phases of natural gas hydrates, such that they are decomposed on the seabed to generate natural gas, resulting in potential risks of causing geological and ecological disasters, and low extraction efficiency. Therefore, the above-mentioned existing methods are currently not commercially available. Hence, exploring an efficient and safe method for mining marine natural gas hydrates has become a hot research topic in the world.

At present, China has conducted sampling twice in the South China Sea. As can be seen from sampling results, natural gas hydrates in China have the characteristics of shallow burial and poor cementation. With respect to such shallow seafloor weakly-cemented natural gas hydrates, a concept of solid-state fluidized mining has emerged. That is, in the case of changing temperature and pressure field equilibrium conditions of natural gas hydrates, the hydrates are directly crushed into fine particles by mechanical mining, and then mixed with seawater and transported to the sea surface through a closed conveying riser, and finally the natural gas hydrate particles are urged by hot seawater to be decomposed to generate natural gas. This mining method has the biggest advantage of avoiding a series of engineering geological disasters caused by the decomposition of hydrates on the seabed without changing the temperature and pressure of a hydrate ore layer and without damaging lower void reservoir hydrates, while avoiding the threat of sea-going ships and an atmospheric greenhouse effect caused by massive overflow of hydrates. The second advantage of this method is that gases decomposed from hydrates in the riser work by expansion to reduce the transmission energy consumption. The third advantage of this method is that the mining efficiency of solid fluidized mining depends on a mechanical mining speed and a decomposition rate of hydrate particles. Compared with the existing mining methods in which the decomposition rate of hydrate particles is much faster, this method has much higher mining efficiency and thus has a favorable application prospect. However, in the mining process, there are still some problems in terms of equipment design, process parameters and existing equipment optimization, such as hydraulic parameters of a jet crushing device, the particle size distribution of crushed hydrate particles, multi-phase conveying equipment of the hydrate particles, and secondary crushing and separation of the hydrate particles.

At present, mechanical crushing is adopted for natural gas hydrate solid-state fluidized mining, but this method has the following two problems: firstly, crushing machinery that operates on the seabed requires a large storage of energy to be transferred from the ground to the seabed, which requires the laying of submarine transmission lines and also involves the problems in the maintenance of mechanical equipment at a later stage; secondly, after the mechanical equipment crushes hydrates, a set of equipment is still needed to transport the crushed hydrates and seawater to the water surface, resulting in a complex operation structure and high cost in coordinated operation of a plurality of sets of equipment. The high-pressure jet crushing improved based on this method refers to jetting high-pressure jet flow on the water surface into the seabed to crush solid hydrates, and inputting the high-pressure jet flow to the seabed by using a pipeline-type multi-phase pump and sucking the crushed hydrates back to the water surface by using a part of jet flow. This method solves the above two problems without submarine transmission lines, and simplifies equipment. However, the equipment in this mining process also involves the optimization of a plurality of parameters, such as the parameters of the jet crushing process, including a pressure of the high-pressure jet flow, a design of a spray head for jet crushing and parameters of secondary processing equipment on the water surface.

SUMMARY

Technical Problem

The technical problem to be solved by the present invention is to provide an experimental device and method capable of simulating a phase change of natural gas hydrates during a jet crushing process, mixed transportation of particles and seawater, secondary crushing of hydrate particles and a hydrate separation effect for a high-pressure jet crushing and mining method, thereby providing process parameters for the solid-state fluidized mining of seabed non-diagenetic hydrates and providing parameter basis of equipment design, manufacturing and mining methods for a natural gas hydrate solid-state fluidized jet mining and crushing process supported by process parameters and equipment.

Solutions of Problems

Technical Solution

The technical solution adopted by the present invention is as follows: an experimental device for natural gas hydrate solid-state fluidized mining and crushing comprises a power liquid supply module, a hydrate suction module, a pipeline conveying module, and a hydrate fluidized crushing module, wherein the power liquid supply module produces a power liquid to provide power for the hydrate suction module and the hydrate fluidized crushing module;

the hydrate suction module is used to suck hydrates crushed by the hydrate fluidized crushing module;

the pipeline conveying module comprises an input pipeline and an output pipeline, wherein the input pipeline conveys the power liquid to the hydrate fluidized crushing module, and the output pipeline conveys the crushed hydrates to the hydrate suction module;

the hydrate fluidized crushing module comprises an experimental tank, a supporting frame placed above the experimental tank, and a speed-adjustable moving mechanism installed on the supporting frame; the moving mechanism comprises a fixed track and a moving slider, a high-pressure jumper tube and a suction jumper tube being vertically installed on the side surface of the moving slider; the upper end of the high-pressure jumper pipe is connected to an outlet of the input pipeline, and the upper end of the suction jumper pipe is connected to an inlet of the output pipeline; a spray head is installed at the lower end of the high-pressure jumper tube, jet nozzles are installed on the spray head, and a recovery head is connected to the lower end of the suction jumper tube and provided with a recovery port thereon; the spray head is fixedly connected to the recovery head.

Further, the experimental device further comprises:

a secondary processing module, which comprises a pipeline-type secondary crushing device and a pipeline-type cyclone separation device, wherein the rear end of the hydrate suction module is sequentially connected with the pipeline-type secondary crushing device and the pipeline-type cyclone separation device; an inlet pipeline and/or an outlet pipeline of the secondary crushing device are/is provided with a sampling port thereon; and an experimental data information collection and processing module, which comprises a processor, wherein the processor is connected to a power liquid outlet of the power liquid supply module, an inlet of the input pipeline and/or a pressure and/or flow detector at a fluid output end of the hydrate suction module; the processor is connected to a controller of a servo motor and used to obtain a set speed of the moving slider.

Further, the hydrate recovery module is a pipeline-type multi-phase pump which comprises a power liquid input end, a power liquid output end, a fluid input end and a fluid output end; an inlet of the power liquid input end is connected to the power liquid outlet of the power liquid supply module, the power liquid output end is connected to the inlet of the input pipeline, and the fluid input end is connected to the outlet of the output pipeline.

Further, a flow and/or pressure adjusting device is provided at the power liquid outlet of the power liquid supply module and/or the fluid output end of the hydrate suction module.

Further, the high-pressure jumper tube and the suction jumper tube are adjusted in their vertical heights by a hoop fixed on the moving slider.

Further, a plurality of jet nozzles is evenly distributed on the quarter side of the spray head; the experimental tank is placed so that one side is close to the spray head, and the jet nozzles are disposed obliquely below one side of the spray head away from the experimental tank.

Further, a transparent observation window is provided on one side of the spray head away from the experimental tank.

Further, a sample is contained in the experimental tank, wherein the sample is a hydrate replacement sample that has mechanical properties similar to natural gas hydrates and is not decomposed under normal temperature and pressure.

Further, the jet nozzles are fixed to the spray head by threads, and the spray head is fixed to the high-pressure jumper pipe by threads; the recovery head is fixed to the suction jumper tube by threads.

Further, an experimental method for the experimental device further comprises:

S1: placing a prepared bulk sample in the experimental tank; injecting water into the experimental tank and flooding the sample with water; adjusting the high-pressure jumper tube and the suction jumper tube to meet a set distance between the jet nozzles and the sample; selecting and installing the experimental spray head, the jet nozzles and the recovery head; setting a moving speed and a total displacement of the moving slider; turning on the experimental data information collection module, and starting a servo motor for commissioning; checking if the moving slider operates stably without interference, and then checking speed and torque output conditions of the servo motor on a computer interface connected to the experimental data information collection module; turning off the servo motor if the speed and torque output conditions are stable without abrupt changes, and restoring the moving slider to a starting end of the experimental tank;

S2: turning on the power liquid supply module and adjusting a pressure and flow of the power liquid input end; turning on the servo motor again, and driving the jet nozzles by the moving slider to move along the fixed track; ejecting high-pressure jet flow from the jet nozzles to perform fluidized crushing on the sample;

S3: turning on the secondary processing module, and feeding the fluid subjected to fluidized crushing sequentially to the pipeline-type secondary crushing device and the pipeline-type cyclone separation device; adjusting a pressure and flow of the fluid output end; reading data of the pressure and flow detectors at the power liquid input end, the power liquid output end and the fluid output end from the experimental data information collection module, and recording the data;

S4: sampling at sampling ports at both ends of the pipe-type secondary crushing device and an outlet of the pipe-type cyclone separation device; after the fluidized crushing is completed, shutting down the experimental device; and S5: changing the number of the jet nozzles and/or shapes of the jet nozzles and/or an arrangement manner of the jet nozzles on the spray head, a moving speed of the moving slider and a pressure and/or flow of the power liquid input end and/or the fluid output end, and repeating the above steps S2 to S4.

Beneficial Effects of the Invention

Beneficial Effects

The present invention has the following beneficial effects:

1. this experimental device and the experimental method therefor simulate the process of jet solid-state fluidized mining, including jet flow injection, crushed hydrate suction, secondary crushing and hydrate separation, and meanwhile, a plurality of pressures and flow detection points and sampling ports for crushed samples are provided to facilitate parameter collection;

2. the parameters of various components of this experimental device are flexible and variable, including changing a drag-back speed of the moving slider, shape parameters of the jet nozzles, and the pressure and flow of the power liquid; and 3. the spray head design of this experimental device simplifies the experimental device, and the dynamic process of jet crushing can be observed from the side surface of the experimental tank.

BRIEF DESCRIPTION OF THE DRAWINGS

Description of the Drawings

Figure 1:
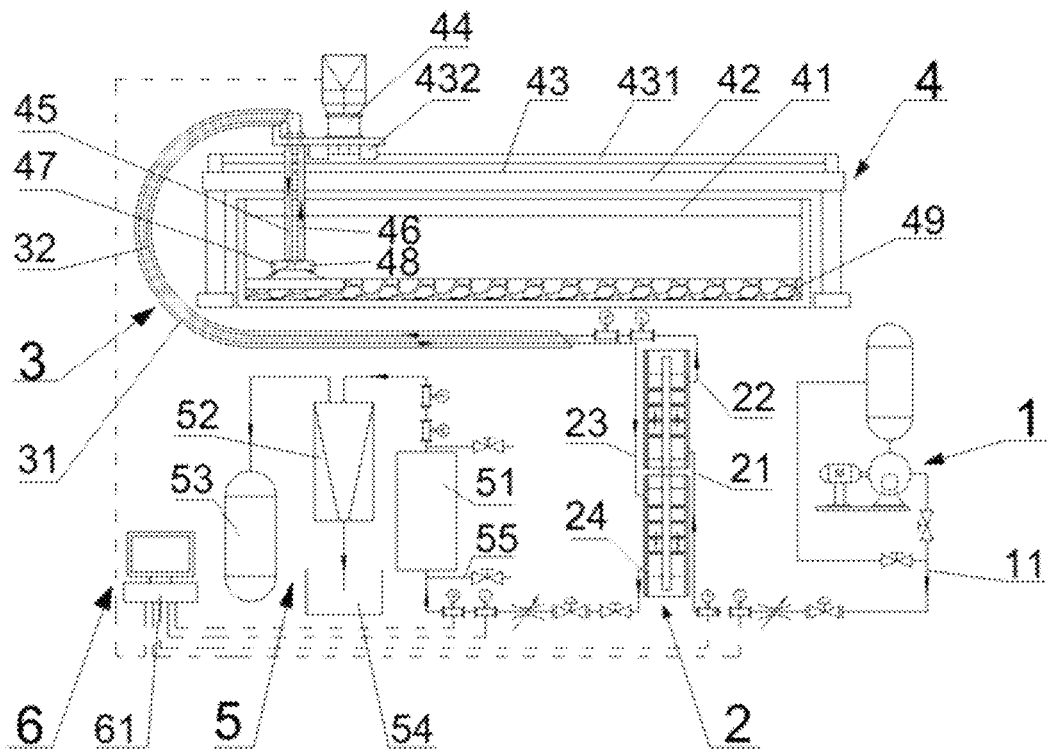
Figure 2:
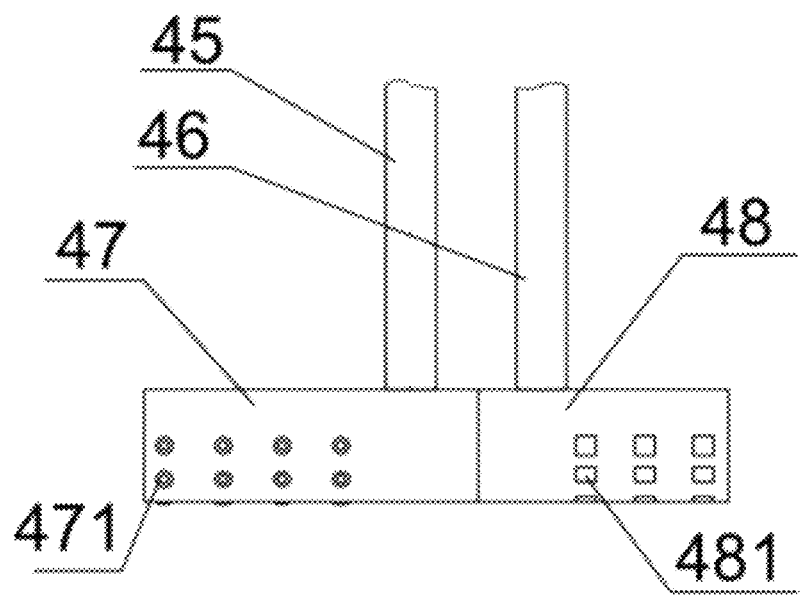
Figure 3:
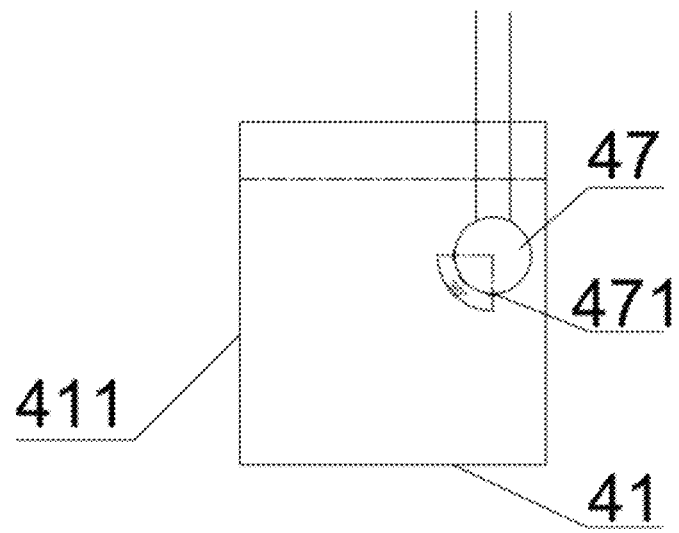
Figure 4:
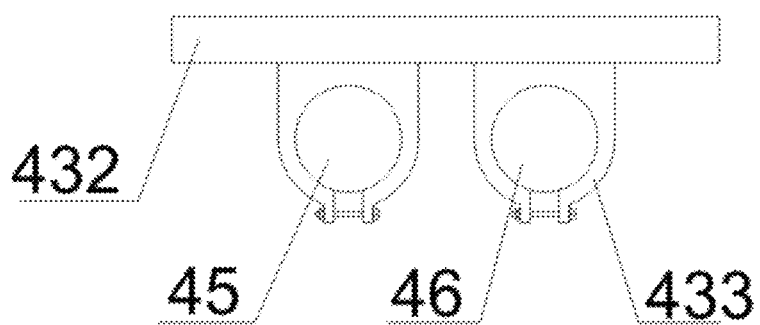

FIG. 1 is a structural schematic diagram according to an embodiment of the present invention;

FIG. 2 is a local schematic diagram of a spray head structure according to an embodiment;

FIG. 3 is a side schematic diagram showing the installation of a spray head and an experimental tank according to an embodiment; and FIG. 4 is a schematic diagram showing the installation of a high-pressure jumper tube and a suction jumper tube according to an embodiment.

In drawings, the reference symbols represent the following components: 1—power liquid supply module; 11—power fluid outlet; 2—hydrate suction module; 21—power liquid input end; 22—power liquid output end; 23—fluid input end; 24—fluid output end; 3—pipeline conveying module; 31—input pipeline; 32—output pipeline; 4—hydrate fluidized crushing module; 41—experiment tank; 411—observation window; 42—supporting frame; 43—moving mechanism; 431—fixed track; 432—moving slider; 433—hoop; 44—servo motor; 45—high—pressure jumper tube; 46—suction jumper tube; 47—spray head; 471—jet nozzle; 48—recovery head; 481—recovery port; 49—sample; 5—secondary processing module; 51—pipeline—type secondary crushing device; 52—pipeline—type cyclone separation device; 53—recovered water tank; 54—recovered sand tank; 55—sampling port; 6—experiment data information collection and processing module; 61—processor.

EMBODIMENT OF THE INVENTION

Detailed Description

In order to make the objectives, technical solutions, and advantages of the present invention clearer, the present invention is further described in detail below with reference to the accompanying drawings and embodiments. It should be understood that the specific embodiments described herein are only used to explain the present invention and are not used to limit the present invention.

Specific Embodiment 1

As shown in FIG. 1 and FIG. 2, the present invention provides an experimental device for natural gas hydrate solid-state fluidized mining and crushing, the experimental device comprising a power liquid supply module 1, a hydrate suction module 2, a pipeline conveying module 3, a hydrate fluidized crushing module 4, a secondary processing module 5 and an experimental data information collection and processing module 6.

The power liquid supply module 1 produces a power liquid to provide power for the hydrate suction module 2 and the hydrate fluidized crushing module 4; the hydrate suction module 2 is used to suck hydrates crushed by the hydrate fluidized crushing module 4; the pipeline conveying module 3 comprises an input pipeline 31 and an output pipeline 32, wherein the input pipeline 31 conveys the power liquid to the hydrate fluidized crushing module 4, and the output pipeline 32 conveys the crushed hydrates to the hydrate suction module 2; the hydrate fluidized crushing module 4 comprises an experimental tank 41, a supporting frame 42 placed above the experimental tank 41, and a speed-adjustable moving mechanism 43 installed on the supporting frame 42; the moving mechanism 43 comprises a fixed track 431 and a moving slider 432, a servo motor 44 for driving the moving slider 432 to move being installed at the upper end of the moving slider 432, and a high-pressure jumper tube 45 and a suction jumper tube 46 being vertically installed on the side surface of the moving slider 432; the upper end of the high-pressure jumper pipe 45 is connected to an outlet of the input pipeline 31, and the upper end of the suction jumper pipe 46 is connected to an inlet of the output pipeline 32; a spray head 47 is installed at the lower end of the high-pressure jumper tube 45, jet nozzles 471 are installed on the spray head 47, and a recovery head 48 is connected to the lower end of the suction jumper tube 46 and provided with a recovery port 481 thereon; the spray head 47 is fixedly connected to the recovery head 48; the secondary processing module 5 comprises a pipeline-type secondary crushing device 51 and a pipeline-type cyclone separation device 52, wherein the rear end of the hydrate suction module 2 is sequentially connected with the pipeline-type secondary crushing device 51 and the pipeline-type cyclone separation device 52; an inlet pipeline and/or an outlet pipeline of the secondary crushing device 51 are/is provided with a sampling port 55 thereon; a recovered sand tank 54 is provided at an outlet below the pipeline-type cyclone separation device 52, and a recovered water tank 53 is provided at an outlet above the pipeline-type cyclone separation device 52; the experimental data information collection and processing module 6 comprises a processor 61, wherein the processor 61 is connected to a power liquid outlet 11 installed in the power liquid supply module 1, an inlet of the input pipeline 31 and/or a pressure and/or flow detector at a fluid output end 24 of the hydrate suction module 2; the processor is connected to a controller of the servo motor 44 and used to obtain a set speed of the moving slider 432. The hydrate recovery module 2 is a pipeline-type multi-phase pump which comprises a power liquid input end 21, a power liquid output end 22, a fluid input end 23 and the fluid output end 24; an inlet of the power liquid input end 21 is connected to a power liquid outlet 11 of the power liquid supply module 1, the power liquid output end 22 is connected to the inlet of the input pipeline 31, and the fluid input end 23 is connected to the outlet of the output pipeline 32. A sample 49 is contained in the experimental tank 41, wherein the sample 49 is a hydrate replacement sample that has mechanical properties similar to natural gas hydrates and is not decomposed under normal temperature and pressure.

An experimental method for the experimental device further comprises:

S1: placing a prepared bulk sample 49 in the experimental tank 41; injecting water into the experimental tank 41 and flooding the sample 49 with water; adjusting the high-pressure jumper tube 45 and the suction jumper tube 46 to meet a set distance between the jet nozzles 471 and the sample 49; selecting and installing the experimental spray head 47, the jet nozzles 471 and the recovery head 48; setting a moving speed and a total displacement of the moving slider 432 to be 5 m/min and 4 m, respectively; turning on the experimental data information collection module 6, and starting the servo motor 44 for commissioning; checking whether the moving slider 432 operates stably without interference, and then checking speed and torque output conditions of the servo motor 44 on a computer interface connected to the experimental data information collection module 6; turning off the servo motor 44 if the speed and torque output conditions are stable without abrupt changes, and restoring the moving slider 432 to a starting end of the experimental tank 41;

S2: turning on the power liquid supply module 1 and adjusting a pressure and flow of the power liquid input end 21 to be 5 NiPa and 1 m3/min, respectively; turning on the servo motor 44 again, and driving the jet nozzles 471 by the moving slider 432 to move along the fixed track 431; ejecting a high-pressure jet flow from the jet nozzles 471 to perform fluidized crushing on the sample;

S3: turning on the secondary processing module 5, and feeding the fluid subjected to fluidized crushing sequentially to the pipeline-type secondary crushing device 51 and the pipeline-type cyclone separation device 52; adjusting a pressure and flow of the fluid output end 24; reading data of the pressure and flow detectors at the power liquid input end 21, the power liquid output end 22 and the fluid output end 24 from the experimental data information collection module 6, and recording the data;

S4: sampling at sampling ports at both ends of the pipe-type secondary crushing device 51 and an outlet of the pipe-type cyclone separation device 52; further analyzing primary crushing, secondary crushing and cycle separation effects on the processed hydrates; after the fluidized crushing is completed, shutting down the experimental device; and S5: changing the number of the jet nozzles 471 and/or shapes of the jet nozzles 471 and/or an arrangement manner of the jet nozzles 471 on the spray head 47, a moving speed of the moving slider 432 and a pressure and/or flow of the power liquid input end 21 and/or the fluid output end 24, and repeating the above steps S2 to S4.

Specific Embodiment 2

As shown in FIG. 1, a further improvement based on Embodiment 1 may be as follows: a flow and/or pressure adjusting device is provided at the power liquid outlet 11 of the power liquid supply module 1 and/or the fluid output end 24 of the hydrate suction module 2.

An experimental method of the improved experimental device is the same as that of the specific embodiment 1. The improvement of this embodiment lies in that: pressures and flows at a plurality of points, including the pressures and flows at the power liquid outlet 11 and/or the fluid output end 24 are changed to find the optimal pressure and flow parameters for the experimental device.

Specific Embodiment 3

As shown in FIGS. 1, 2 and 4, a further improvement based on Embodiment 1 may be as follows: the high-pressure jumper tube 45 and the suction jumper tube 46 are adjusted in their vertical heights by a hoop 433 fixed on the moving slider 432. The jet nozzles 471 are fixed to the spray head 47 by threads, and the spray head 47 is fixed to the high-pressure jumper pipe 45 by threads; the recovery head 48 is fixed to the suction jumper tube 46 by threads.

An experimental method of the improved experimental device is the same as that of the specific embodiment 1. The improvement of this embodiment lies in that: the high-pressure jumper tube 45, the suction jumper tube 46, the spray head 47, the jet nozzles 471 and the recovery head are detachable; a plurality of parameters, including a distance between the jet nozzles 471 and the sample 49 can be adjusted; the jet nozzles 471 having different geometric parameters or the recovery head 48 can be replaced.

Specific Embodiment 4

As shown in FIG. 3, a further improvement based on Embodiment 1 may be as follows: a plurality of jet nozzles 471 is evenly distributed on the quarter side of the spray head 47; the experimental tank 41 is placed so that one side is close to the spray head 47, and the jet nozzles 471 are disposed obliquely below one side of the spray head 47 away from the experimental tank 41. A transparent observation window 411 is provided on one side of the spray head 47 away from the experimental tank 41.

An experimental method of the improved experimental device is the same as that of the specific embodiment 1. The improvement of this embodiment lies in that: the arrangement of the jet nozzles 471 of the spray head 47 on the quarter circumferential surface may be used to implement crushing of the sample 49 in the entire experimental tank 41, thereby simplifying the experimental device. Meanwhile, the design of the observation window 411 allows an experimenter to see a dynamic scene of the sample 49 subjected to jet crushing from the side surface of the transparent experimental tank 41.

It may be derived from the above content that, according to the experimental device and the experiment method therefor, a jet solid-state fluidized mining process, including jet flow injection and suction of crushed hydrates, is simulated, and a plurality of pressure and flow detection points and sampling ports are provided at the same time so as to facilitate parameter collection; a plurality of component parameters of the experimental device are flexibly variable, including changing a drag-back speed of a moving slider 432, shape parameters of the jet nozzles 471, and a pressure and flow of the power liquid; meanwhile the spray head is designed to simplify the experimental device. In addition, the dynamic process of jet crushing can be observed from the side surface of the experimental tank. This experimental device and the experimental method have the significance that the most suitable mining equipment and mining method parameters under the conditions of field mining can be simulated by using the jet crushing and mining method.

The above disclosure is only the preferred embodiments of the present invention, and of course cannot be intended to limit the scope of the present invention. Therefore, equivalent changes made according to the claims of the present invention still fall within the scope of the present invention.

The invention claimed is:

1. An experimental device for natural gas hydrate solid-state fluidized mining and crushing, the experimental device comprising a power liquid supply module, a hydrate suction module, a pipeline conveying module, and a hydrate fluidized crushing module, wherein the power liquid supply module produces a power liquid to provide power for the hydrate suction module and the hydrate fluidized crushing module;

the hydrate suction module sucks hydrates crushed by the hydrate fluidized crushing module;

the pipeline conveying module comprises an input pipeline and an output pipeline, wherein the input pipeline conveys the power liquid to the hydrate fluidized crushing module, and the output pipeline conveys the crushed hydrates to the hydrate suction module;

the hydrate fluidized crushing module comprises an experimental tank, a supporting frame placed above the experimental tank, and a speed-adjustable moving mechanism installed on the supporting frame; the moving mechanism comprises a fixed track, a moving slider, a high-pressure jumper tube, and a suction jumper tube being vertically installed on a side surface of the moving slider; an upper end of the high-pressure jumper tube is connected to an outlet of the input pipeline, and an upper end of the suction jumper tube is connected to an inlet of the output pipeline; a spray head is installed at a lower end of the high-pressure jumper tube, a plurality of jet nozzles are installed on the spray head, and a recovery head is connected to a lower end of the suction jumper tube and provided with a recovery port thereon; the spray head is fixedly connected to the recovery head.

2. The experimental device for natural gas hydrate solid-state fluidized mining and crushing according to claim 1, further comprising:
- a secondary processing module, which comprises a pipeline-type secondary crushing device and a pipeline-type cyclone separation device, wherein a rear end of the hydrate suction module is sequentially connected with the pipeline-type secondary crushing device and the pipeline-type cyclone separation device; an inlet pipeline and/or an outlet pipeline of the pipeline-type secondary crushing device are/is provided with a sampling port thereon; and
- an experimental data information collection and processing module, which comprises a processor, wherein the processor is connected to a power liquid outlet of the power liquid supply module, an inlet of the input pipeline and/or a pressure and/or a flow detector at a fluid output end of the hydrate suction module; the processor is connected to a controller of a servo motor and used to obtain a set speed of the moving slider.

3. The experimental device for natural gas hydrate solid-state fluidized mining and crushing according to claim 1, wherein the hydrate suction module is a pipeline-type multiphase pump which comprises a power liquid input end, a power liquid output end, a fluid input end and a fluid output end; an inlet of the power liquid input end is connected to a power liquid outlet of the power liquid supply module, the power liquid output end is connected to an inlet of the input pipeline, and the fluid input end is connected to an outlet of the output pipeline.

4. The experimental device for natural gas hydrate solid-state fluidized mining and crushing according to claim 1, wherein a flow and/or pressure adjusting device is provided at a power liquid outlet of the power liquid supply module and/or a fluid output end of the hydrate suction module.

5. The experimental device for natural gas hydrate solid-state fluidized mining and crushing according to claim 1, wherein the high-pressure jumper tube and the suction jumper tube are adjusted in vertical heights by a hoop fixed on the moving slider.

6. The experimental device for natural gas hydrate solid-state fluidized mining and crushing according to claim 1, wherein the plurality of jet nozzles are evenly distributed on a quarter side of the spray head; the experimental tank is placed so that one side is close to the spray head, and the plurality of jet nozzles are disposed obliquely below one side of the spray head away from the experimental tank.

7. The experimental device for natural gas hydrate solid-state fluidized mining and crushing according to claim 6, wherein a transparent observation window is provided on the one side of the spray head away from the experimental tank.

8. The experimental device for natural gas hydrate solid-state fluidized mining and crushing according to claim 1, wherein a sample is contained in the experimental tank, and the sample is a hydrate replacement sample that is not decomposed under normal temperature and pressure.

9. The experimental device for natural gas hydrate solid-state fluidized mining and crushing according to claim 1, wherein the plurality of jet nozzles are fixed to the spray head by threads, and the spray head is fixed to the high-pressure jumper tube by threads; the recovery head is fixed to the suction jumper tube by threads.

10. A method for fluidized mining and crushing natural gas hydrate solid-state using the experimental device according to claim 1, comprising the following steps:

S1: placing a prepared bulk sample in the experimental tank; injecting water into the experimental tank and flooding the sample with the water; adjusting the high-pressure jumper tube and the suction jumper tube to meet a set distance between the plurality of jet nozzles and the sample; selecting and installing an experimental nozzle, the plurality of jet nozzles and the recovery head; setting a moving speed and a total displacement of the moving slider; turning on an experimental data information collection module, and starting a servo motor for commissioning; checking if the moving slider operates stably without interference, and then checking speed and torque output conditions of the servo motor on a computer interface connected to the experimental data information collection module; turning off the servo motor if the speed and torque output conditions are stable without abrupt changes, and restoring the moving slider to a starting end of the experimental tank;

S2: turning on the power liquid supply module and adjusting a pressure and flow of a power liquid input end; turning on the servo motor again, and driving the plurality of jet nozzles by the moving slider to move along the fixed track; ejecting high-pressure jet flow from the plurality of jet nozzles to perform fluidized crushing on the sample;

S3: turning on a secondary processing module, and feeding a fluid subjected to fluidized crushing sequentially to a pipeline-type secondary crushing device and a pipeline-type cyclone separation device; adjusting a pressure and flow of a fluid output end; reading data of pressure and flow detectors at the power liquid input end, a power liquid output end and the fluid output end from the experimental data information collection module, and recording the data;

S4: sampling at sampling ports at both ends of the pipeline-type secondary crushing device and an outlet of the pipeline-type cyclone separation device; after the fluidized crushing is completed, shutting down the experimental device; and S5: changing a number of the plurality of jet nozzles and/or shapes of the plurality of jet nozzles and/or an arrangement manner of the plurality of jet nozzles on the spray head, a moving speed of the moving slider and a pressure and/or flow of the power liquid input end and/or the fluid output end, and repeating the above steps S2 to S4.

* * * * *